United States Patent [19]

Herwig et al.

[11] Patent Number: 4,882,393

[45] Date of Patent: Nov. 21, 1989

[54] IONOMER-MODIFIED POLYETHYLENE AS FILM MATERIAL

[75] Inventors: Jens Herwig, Cologne; Alois Kolwert, Roesrath; Hubert Sutter, Leverkusen; Dieter Woltjes, Dormagen, all of Fed. Rep. of Germany

[73] Assignee: EC Erdoelchemie GmbH, Cologne, Fed. Rep. of Germany

[21] Appl. No.: 230,559

[22] Filed: Aug. 10, 1988

Related U.S. Application Data

[63] Continuation of Ser. No. 927,906, Nov. 6, 1986, abandoned.

[30] Foreign Application Priority Data

Nov. 21, 1985 [DE] Fed. Rep. of Germany ....... 3541096
Jun. 13, 1986 [DE] Fed. Rep. of Germany ....... 3620034
Sep. 12, 1986 [DE] Fed. Rep. of Germany ....... 3631005

[51] Int. Cl.$^4$ ............................................... C08F 8/42
[52] U.S. Cl. .......................... 525/330.2; 260/DIG. 31
[58] Field of Search .................. 525/330.2, 330.6, 366, 525/370

[56] References Cited

U.S. PATENT DOCUMENTS 3,264,272 8/1966 Rees ................................. 525/330.2

*Primary Examiner*—Christopher Henderson
*Attorney, Agent, or Firm*—Sprung Horn Kramer & Woods

[57] ABSTRACT

An ionomer-modified polyethylene, that is, an ethylene/carboxylic acid copolymer in which at least some of the acidic groups are neutralized, is preparable by a one-stage procedure by reacting ethylene with unsaturated carboxylic acids and salts of such unsaturated carboxylic acids in the presence of a free radical polymerization initiator, under the conditions employed in the production of high pressure polyethylene (LDPE). The concentration of salt which is incorporated in the polymer is kept at no more than 1 mol %, relative to converted ethylene and other comonomers respectively. Advantageously, the unsaturated carboxylic acids and their salts are added to the copolymerization reaction as a homogeneous solution in a suitable solvent.

The ionomer-modified polyethylenes based on low density polyethylene (LDPE), in which 30–95% of the carboxyl groups are neutralized and the neutralized carboxyl groups represent 0.1–0.8 mol % of the total number of moles of all monomers are suitable as a film material having high strength, good drawability and high tear propagation resistance.

3 Claims, 1 Drawing Sheet

IONOMER-MODIFIED POLYETHYLENE AS FILM MATERIAL

This is a continuation of application Ser. No. 927,906, filed Nov. 6, 1986, now abandoned.

The invention relates to one-stage preparable ionomer-modified polyethylene, that is, ethylene/carboxylic acid copolymers in which at least some of the acid groups are neutralized which are based on low density polyethylene. The invention furthermore relates to its preparation, its use as film material, and the film material itself.

U.S. 3,264,272 discloses that a copolymer prepared in a first process stage, for example from ethylene and methacrylic acid, can be neutralized, in a second process stage under homogeneous conditions, with monovalent or divalent cations, which are supplied in the form of suitable compounds. However, the necessary second preparation step of neutralization under homogeneous conditions, that is to say the further melting of the acid copolymers, the incorporation of suitable cations and the removal of the resulting cleavage products (water, alcohols and others), gives rise to higher costs in comparison with a customary one-stage copolymerization, such as, for example, in the case of an ethylene/vinyl acetate copolymer.

The copolymerization behaviour of sodium acrylate in aqueous or protic solutions has been studied previously. A difference in the copolymerization behaviour of methacrylate and unneutralized methacrylic acid has been found (J. Am. Chem. Soc. 75 (1953), 4221–4223).

The copolymerization parameters of salts of unsaturated carboxylic acids can vary substantially and may do so as a critical function of the type and size of the cation and depending on the solvent (Eur. Polym. 3—7 (1971), 797–804; Ibid. 8 (1972), 921–926).

The copolymerization becomes particularly difficult in those cases in which the comonomers form a plurality of phases, that is to say when the individual comonomers are immiscible or insufficiently miscible with one another, as in the case, for example, for ethylene and sodium methacrylate. Because of the high concentrations of pure monomers in each case in the individual phases of such a system, the preconditions for a copolymerization determined only by statistics are poor, so that, in the main, a mixture of homopolymers which may contain block copolymers is to be expected. Hence, the preparation of an ionomer from a mixture of ethylene and salts of unsaturated carboxylic acids, if appropriate a solution of the salts, appeared to have poor prospects of success. Thus, it could further be expected, that the ionomer-modified polyethylenes prepared according to such a process, would have undesireable properties, e.g. inhomogeneities and poor mechanical properties.

Surprisingly, a homogeneous, ionomer-modified polyethylene was nevertheless obtained by a direct, that is to say a one-stage, preparation.

An ionomer-modified polyethylene (ethylen/carboxylic acid copolymer in which at least some of the acid groups are neutralized), and which can be modified by adding further comonomers, has been obtained by a process wherein ethylene and, if appropriate, the further comonomers, are reacted, under the conditions employed in ethylene high pressure polymerization, with at least one metal salt of an unsaturated carboxylic acid or with at least one unsaturated carboxylic acid and at least one metal salt of this acid or with a homogeneous solution of at least one such metal salt or a salt/acid mixture, in the presence of free radical polymerization initiators. The concentration of the incorporated neutralized unsaturated carboxylic acids is kept at no more than 1 mol %, relative to converted ethylene and other comonomers respectively.

Acrylic acid, methacrylic acid, maleic acid, monomaleates, itaconic acid and fumaric acid, preferably methacrylic acid and acrylic acid, may be mentioned as examples of unsaturated carboxylic acids.

Monovalent, divalent or trivalent cations, such as those of lithium, sodium, potassium, magnesium, calcium, zinc, copper or aluminum, may be mentioned as cations of salts of such unsaturated acids. Salts with monovalent or divalent cations are preferably mentioned. In principle, cations of further metals may be used. But, many of them are excluded due to their high cost or their toxicity (e.g. barium). The cations of sodium, zinc and magnesium are especially preferably mentioned.

In the ionomer-modified polyethylene according to the invention, at least some of the acid groups are neutralized. A degree of neutralization of preferably 50–100%, may be mentioned by way of example. That is to say, for the preparation, according to the invention, of such ionomers, the metal salts of unsaturated carboxylic acids or a mixture of such metal salts with unneutralized unsaturated carboxylic acids are employed. Preferably, not all acid groups are neutralized in the ionomer prepared according to the invention, that is, a mixture of metal salts of unsaturated carboxylic acids with unneutralized unsaturated carboxylic acids is preferably employed. The degree of neutralization is thus 30–98%, preferably 30–95%, particularly preferably 50–90% and very particularly preferably 60–85%.

The preferred concomitant use of unneutralized unsaturated carboxylic acids in addition to the salts gives ionomer-modified polyethylenes having stable melt indices. An increase in the melt flow index is frequently observed in ionomers in the course of time when the acid groups are completely neutralized (see Table 1, Example 1 and 3).

In addition to the ethylene and to the salt of unsaturated carboxylic acid or the mixture comprising unsaturated carboxylic acid/salt, further comonomers may be incorporated as copolymerized units into the ionomer-modified polyethylene, so that terpolymers or higher copolymers are formed. Examples of suitable further comonomers of this type are vinyl acetate, acrylonitrile, carbon monoxide, sulphur dioxide, maleic acid diesters, acrylic acid esters, methacrylic acid esters or mixtures of these substances, preferably vinyl acetate, acrylic acid esters or methacrylic acid esters.

The invention furthermore relates to a process for the preparation of ionomer-modified polyethylene (ethylene/carboxylic acid copolymers in which at least some of the acid groups are neutralized), which can be modified by adding further comonomers, which is characterized in that ethylene and, if appropriate, the further comonomers are reacted, under the conditions employed in ethylene high pressure polymerization, with at least one metal salt of an unsaturated carboxylic acid or with at least one unsaturated carboxylic acid and at least one metal salt of this acid or with a homogeneous solution of at least one such metal salt or a salt/acid mixture, in the presence of free radical polymerization initiators. The concentration of the incorporated neutralized unsaturated carboxylic acid is kept at no more than 1 mol%, relative to converted ethylene and other comonomers respectively.

In case where a mixture of the unsaturated carboxylic acid (or several acids) and the associated salt or salts is homogeneous, the mixture may be fed, as such, to the copolymerization. In many cases, however, it is advantageous to use s solvent for the unsaturated carboxylic acids employed and for their salts. Examples of suitable solvents for this purpose are methanol, ethanol, propanol, isopropanol, butanol, isobutanol, amyl alcohol, glycol and other solvents which are stable under high pressure polymerization conditions, such as dimethylformamide or tetrahydrofuran; mixtures of these solvents can of course also be employed. The amount of solvent which permits the preparation of a homogeneous solution of the unsaturated carboxylic acids and their salts may be mentioned as the minimum amount of solvent to be employed. The upper limit of the amount of solvent is determined by economic considerations, since the solvent has to be removed from the polymerization reaction. Amounts of 2-10 parts by weight of solvent per part by weight of the mixture of unsaturated acid/unsaturated salts, preferably 4-7 parts of solvent per part of the mixture of unsaturated acid/unsaturated salt are often suitable.

The process according to the invention is carried out under the conditions employed for ethylene high pressure polymerization. For this purpose, pressures in the range of 500-3000 bar, preferably 1200-3000 bar, and temperatures in the range of 120-300° C., preferably 160-280° C., particularly preferably 200-260° C., may be mentioned. The polymerization is carried out continuously, for example in an adiabatically operated autoclave or in a corresponding autoclave cascade. Where an autoclave cascade is used, the possibility of employing the subsequent autoclave as residence time reactors for completing the conversion of the comonomers can be utilized. Furthermore, the polymerization can be carried out in a flow tube or in a combination of stirred autoclave and flow tube. Operation in series with two stirred autoclaves is particularly preferred, and there is the possibility of achieving virtually complete conversion of the comonomers in the second reactor.

Examples of free radical polymerization initiators which can be employed according to the invention are: tert.-butyl peracetate, di-tert.-amyl peroxide, di-tert.-butyl peroxide, tert.-butyl hydroperoxide, tert.-amyl perpivalate, butyl per-2-ethylhexanoate, tert.-butyl perpivalate, tert.-butyl perneodecanoate, tert.-butyl perisononanoate, tert.-amyl perneodecanoate or tert-butyl perbenzoate. The reaction can also be carried out in the presence of molecular weight regulators, such as saturated and unsaturated hydrocarbons or oxo compounds, for example ethane, propane, propene, acetone, acetaldehyde, propionaldehyde, glyoxal, or the like.

The total amount of the incorporated neutralized unsaturated carboxylic acid (or several such carboxylic acids) is not more than 1 mol %, relative to the ethylene converted and other comonomers respectively, for example 0.05-1 mol %, preferably 0.1-0.8 mol %, particularly preferably 0.2-0.6 mol %.

In comparison with analogous ethylene homopolymers, the ionomer-modified ethylene copolymers exhibit some remarkable improvements in properties in the case of the optical properties (gloss, transparency), the strength (for example dart drop) and the drawability. These specific properties are derived in particular from the presence of ionic bonds and states of order. These are responsible, in particular, for the phenomenon whereby these ionomers in the solid state have strengths which are substantially superior to that of an LDPE prepared under comparable conditions. In the melt, on the other hand, they behave like an LDPE of the same structure without ionomer groups. This phenomenon indicates that the ionomeric groups perform a thermally reversible function which, in the solid state, has the effect of expanding the molecules or compacting the molecules.

The property spectrum of an ionomer-modified LDPE essentially depends on the concentration of its ionomer groups. Ionomer group concentrations, that is to say neutralizd carboxylic groups, of at least 2, more destinctly from approximately 5 mol %, are normally required for the pronounced property spectrum.

The ionomer-related properties mentioned above are usually reinforced in the positive sense as the concentration of ionomer groups increases. However, the tear propagation resistance decreases sharply (see FIG. 1), which as a very adverse effect on the performance characteristics, for example in the case of films prepared therefrom. Ionomeric copolymers of ethylene are therefore preferably employed for the production of industrial moldings, where high strength and toughness and good processability from the melt are important.

The incorporation of ionomeric groups increases the water-absorbing power of these copolymers. This applied both to the surrounding water and to the water of reaction formed in the neutralization described above. The water present in a copolymer having 2-5 or more mol % concentration of ionomer groups causes problems during processing of these substances from the melt, for example blister formation in moldings. In order to avoid these problems, the material has to be dried and stored under dry conditions, which entails considerable effort.

The invention furthermore relates to ionomer-modified polyethylene (ethylene/carboxylic acid copolymers in which at least some of the acid groups are neutralized), based on low density polyethylene (LDPE), that is, on a polyethylene which is prepared by a high pressure process, which can be modified by adding further comonomers, which is characterized in that 30-95%, preferably 50-90%, of the carboxyl groups present in the copolymer are neutralized, and the neutralized carboxyl groups represent 0.1-0.8, preferably 0.15-0.6, mol % of the total number of mols of all monomers.

It is evident from the above statements that, on the one hand, pronounced ionomer character can be expected only above an ionomer group concentration of 2 mol%. On the other hand, a drastic deterioration in the tear propagation resistance and increased water absorptivity, which causes problems during processing, are obstacles to the use of the ionomer-modified LDPE as film material.

Surprisingly, there are nevertheless, in the range of very low ionomer group concentrations and within certain neutralization ranges, as in the inventive ionomer-modified polyethylene, oustandingly suitable film materials of ionomer-modified LDPE, in which unexpectedly high strengths and drawabilities coupled with virtually constant good tear propagation resistance are achieved, as shown in FIG. 1 and the associated examples.

The invention thus furthermore relates to the use of the inventive ionomer-modified polyethylene as film material and this film material itself.

Film material based on low density polyethylene (LDPE) which is ionomer-modified has been found, which is characterized in that 30-95% of the carboxyl groups present in the copolymer are neutralized, and the neutralized carboxyl groups represent 0.1-0.8 mol % of the total number of moles of all monomers.

The neutralized carboxyl groups in the film material, calculated as neutralized comonomers containing carboxyl groups represent 0.1-0.8 mol %, preferably 0.15-0.6 mol %, of the total number of moles of all incorporated monomers. In the case of comonomers which contain two carboxyl groups, these mol % figures must be halved corresponding to the fact that the number of carboxyl groups has doubled. In a corresponding manner, where polyvalent cations are used for neutralization, their mol % figures must be determined by dividing by their valence. Thus, for example, 0.1-0.8 mol % of neutralized carboxyl groups are to be obtained by using 0.05-0.40 mol % zinc ions.

The neutralized carboxyl groups represent 30-95% preferably 50-90%, of all carboxy groups present.

From the wide range of melt indices which can be obtained in a known manner by controlling the polymerization, those in the range of 0.1-20 g/10 min may be mentioned in the film sector for the film materials according to the invention. These melt indices are measured in a customary manner at 190° C. and under a load of 2.16 kp. Particularly preferably, melt indices are selected in the range of 0.3-5 g/10 min/190° C.; 2.16 kp.

The film material according to the invention is distinguished - as already partly mentioned - by a number of unexpected and remarkable improvements compared with a non-ionomer-modified LDPE:
- very high drawability to films
- very high mechanical strengths (for example dart drop)
- very good processability on machines (increased output rate, excellent bubble stability)
- high transparency.

Among the unexpectedly improved properties listed, the high drawability and the strength of the films which can be produced from the film materials according to the invention are particularly surprising. Experience with the ethylene copolymers which are not ionomer-modified does in fact show that measures which lead to an improvement in the drawability and in the optical qualities (transparency, gloss) usually result in a deterioration in the strength properties, and the reverse is also true.

With regard to its drawability, the film material according to the invention is equivalent or superior to a comparable linear low density polyethylene (LLDPE). In contrast to this, however, the film material according to the invention can be processed on conventional film extruders in the same way as LDPE, which saves the film manufacture an expensive conversion or even the purchase of a new film extruder.

This disadvantages characteristic of ionomer-modified polyethylene - increased water absorptivity and associated processing problems, poor tear propagation resistance - suprisingly do not appear in the case of the film material according to the invention. Even the amount of water liberated during subsequent neutralization can remain in the product without causing harm; furthermore, storage in the absence of atmospheric moisture is not necessary.

Finally, the surprisingly low content of ionomer groups in the film material according to the invention is also an important economic factor, since the extra material costs are very low and are more than compensated by the gain achieved as a result of improvements in properties and/or increased conversion.

The film materials according to the invention can be prepared by the process, described above, for the one-stage copolymerization of ethylene and unsaturated acids as a mixture with their salts. The film materials according to the invention can of course also be produced in a conventional manner, in which a copolymer of ethylene and unsaturated carboxylic acids (if appropriate with the further addition of the abovementioned further comonomers so that a terpolymer is formed) is prepared first and then in a second preparation step is neutralized only to the stated extent with one or more compounds of one of the abovementioned metals (for example oxides, hydroxides, alcoholates, salts). Neutralization of this type which takes place in a second preparation step can be carried out on a calender or in an extruder, in a manner familiar to the skilled worker. In the case of this last-mentioned neutralization it is particularly advantageous if it is carried out in the discharge extruder of the production plant for the film material according to the invention. The concentration of ionomer groups, which is very low according to the invention, and the amount of metal compound required for neutralization, which is therefore likewise very low, make it unnecessary to carry out a separate operation to remove the cleavage products (for example water) liberated during the neutralization.

EXAMPLES 1-13

In 2 glandless 700 ml highpressure stirred autoclaves which are flowed through continuously in series and have ideal back-mixing characteristics, the monomer streams listed in the table were copolymerized in the two reactors under a reaction pressure of up to 1850 bar by the addition of, in each case, PN (tert.-butyl perisononanoate) or PO (tert.-butyl perisooctanoate). In a downstream flash separator the copolymer was freed from unconverted ethylene and the methanol used as a solvent.

Propionaldehyde (PRAL) or propene (PEN) were added to the inlet stream to regulate the molecular weight. The reaction temperature was controlled via the amount of initiator.

The experimental parameters and product properties are shown in the table.

BRIEF DESCRIPTION OF FIG. 1

FIG. 1 illustrates the film properties (examples 6-13).

DETAILED DESCRIPTION OF FIG. 1

Figure 1:
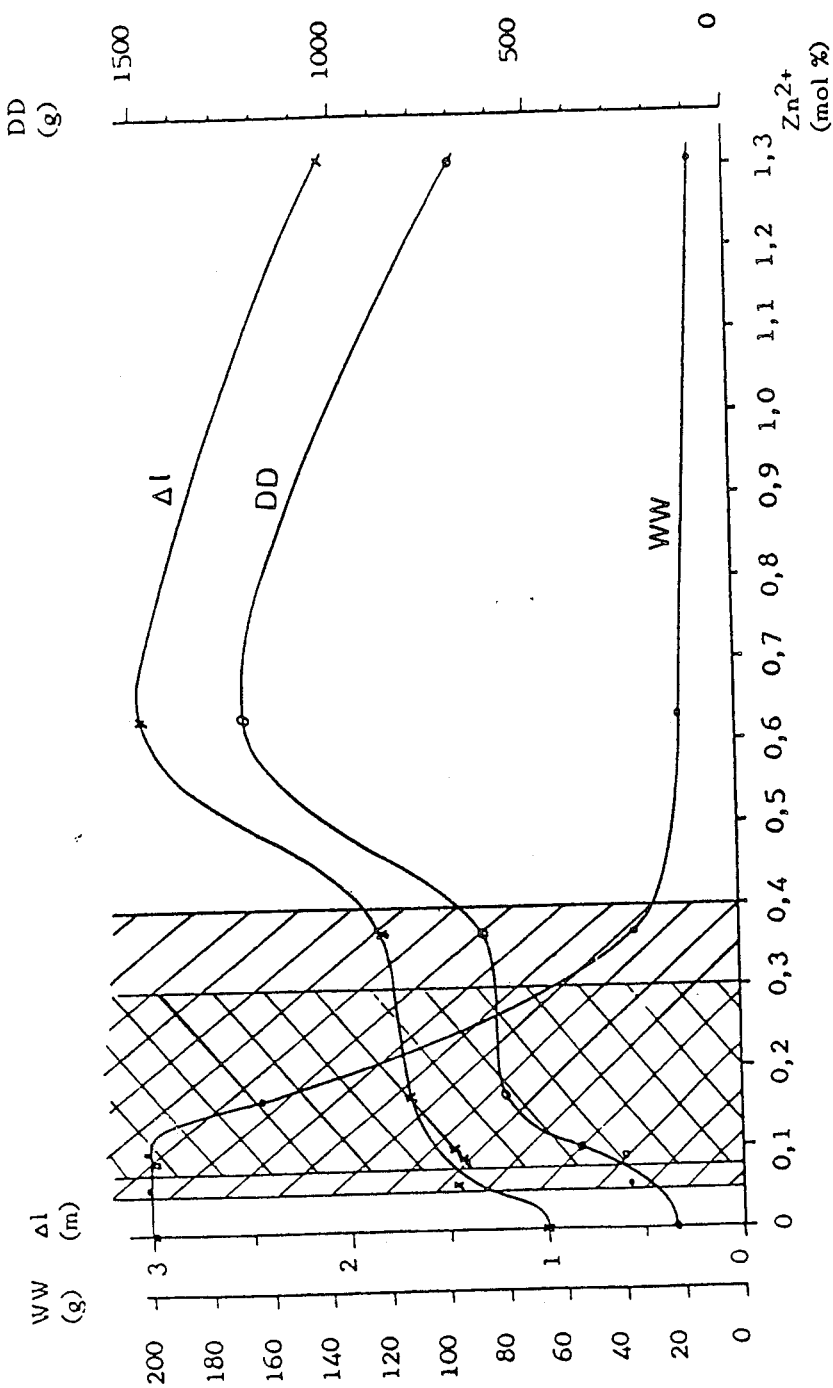

FIG. 1 illustrates the film properties (Examples 6-13)
tear propagation resistance TP (g)
relative extrudability Δ1 (m) and
dart drop strength DD (g)
as a function of the zinc ion concentration $Zn^{2+}$ (mol %), relative to the total number of moles of ethylene and methacrylic acid. To ensure comparability, products having the same final melt index were aimed at.

The relevant range is shaded with single lines, and the preferred range is cross-hatched.

TABLE 1

Examples 1-5: One-stage ionomer synthesis by salt polymerization

| Example No. | Amount of ethylene used (kg/h) | Comonomer mixture**** | | | | PRAL regulator Amount (g/h) | PN initiator | | Metal methacrylate, relative to copolymer yield (mol %) |
|---|---|---|---|---|---|---|---|---|---|
| | | Type 1 | Amount (g/h) | Type 2 | Amount (g/h) | | Reactor 1 Amount (g/h) | Reactor 2 Amount (g/h) | |
| 1 | 30 | NaMA | 55 | MAA | — | 63 | 0.6 | 0.05 | 0.306 |
| 2 | 40 | NaMA | 55 | MAA | 15 | 75 | 2.1 | 0.04 | 0.221 |
| 3 | 30 | Zn(MA)$_2$ | 60 | MAA | — | 113 | 0.9 | 0.06 | 0.147 |
| 4 | 40 | Zn(MA)$_2$ | 60 | MAA | 15 | 81 | 0.8 | 0.07 | 0.117 |
| 5 | 40 | Mg(MA)$_2$ | 51 | MAA | 15 | 85 | 0.9 | 0.05 | 0.199 |

*Melt index at 190° C./2.16 kp
**See through clarity
***Electronic puncture strength
****MAA: methacrylic acid
NaMA: sodium methacrylate
Zn(MA)$_2$: zinc dimethacrylate
Mg(MA)$_2$: magnesium dimethacrylate

| Example No. | Temperature T$_R^1$ (°C.) | T$_R^2$ (°C.) | Yield copolymer (kg/h)mer | MI* during production (g/10 min) | after 200 h (g/10 min) | ΔMI (g/10 min) | Shock resistance*** (J) | Transparency** (%) |
|---|---|---|---|---|---|---|---|---|
| 1 | 240 | 260 | 4.7 | 1.3 | 2.2 | 0.9 | 0.16 | 75 |
| 2 | 240 | 260 | 6.5 | 1.9 | 2.0 | 0.1 | 0.20 | 87 |
| 3 | 240 | 260 | 4.9 | 1.8 | 6.0 | 4.2 | 0.13 | 76 |
| 4 | 240 | 260 | 6.1 | 1.2 | 1.2 | 0 | 0.68 | 89 |
| 5 | 240 | 260 | 6.2 | 1.6 | 1.6 | 0 | 0.35 | 86 |

*Melt index at 190° C./2.16 kp (during production and after 200 h)
**See through clarity
***Electronic puncture strength
**** MAA: methacrylic acid
NaMA: sodium methacrylate
Zn(MA)$_2$: zinc dimethacrylate
Mg(MA)$_2$: magnesium dimethacrylate

TABLE 2

Examples 6-13: Two stage ionomer synthesis by neutralization of the acid copolymer in a ZSK 32 extruder via ZnO masterbatch: The masterbatch used for the neutralization was essentially compounded of 22.5% by weight of ZnC and of high pressure polyethylene (LDPE with MI = 7 g/10 min and d = 0.9185 g/cm$^3$). Metering in of the monomer mixture was split in a ratio of 5:1 between the reactors 1 and 2.

| Example No. | Amount of ethylene used (kg/h) | Amount of methacrylic acid used (g/h) | Regulator Amount/type (g/h) | Initiator Reactor 1: PO Amount (g/h) | Reactor 2: PN Amount (g/h) | Temperature T$_R^1$ (°C.) | T$_R^2$ (°C.) |
|---|---|---|---|---|---|---|---|
| 6 | 40 | 67 | 1267/PEN | 3.62 | 0.38 | 212 | 250 |
| 7 | 40 | 32 | 1352/PEN | 3.31 | 0.31 | 212 | 250 |
| 8 | 40 | 42 | 1408/PEN | 3.52 | 0.24 | 212 | 250 |
| 9 | 40 | 53 | 1438/PEN | 3.62 | 0.28 | 212 | 250 |
| 10 | 40 | 82 | 1474/PEN | 3.6 | 0.35 | 212 | 250 |
| 11 for comparison | 40 | 177 | 152/PRAL | 1.97 | 0.12 | 212 | 250 |
| 12 for comparison | 27 | 212 | 100/PRAL | 0.93 | 0.06 | 212 | 250 |
| 13 for comparison | 27 | 447 | 104/PRAL | 1.86 | 0.19 | 212 | 250 |
| 4 see above | 40 | Zn(MA)$_2$ 260 MAA 15 | 81/PRAL | 0.8 | 0.07 | 240 | 260 |

| Example No. | Yield of copolymer (kg/h) | MAA content (% by weight/mol %) | MI (g/10 min) | MI after neutralization (g/10 min) | Zn (mol %) | Relative extrudability Δ l (m) | Tear propagation resistance (g) | Dart drop (g) |
|---|---|---|---|---|---|---|---|---|
| 6 | 6.1 | 1.1/0.36 | 1.4 | 1.4 | — | 1.0 | 200 | 168 |
| 7 | 6.1 | 0.52/0.17 | 2.05 | 1.78 | 0.059 | 1.48 | 202 | 282 |
| 8 | 6.1 | 0.67/0.22 | 2.58 | 1.72 | 0.088 | 1.44 | 196 | 300 |
| 9 | 6.1 | 0.86/0.28 | 2.25 | 1.56 | 0.1 | 1.49 | 218 | 410 |
| 10 | 6.1 | 1.34/0.44 | 4.0 | 2.15 | 0.165 | 1.7 | 164 | 610 |
| 11 for comparison | 5.9 | 3.0/1.00 | 12.8 | 1.8 | 0.37 | 1.82 | 35 | 650 |
| 12 | 3.9 | 5.4/1.82 | 28.7 | 2.24 | 0.63 | 3.0 | 19 | 1250 |

TABLE 2-continued

Examples 6–13: Two stage ionomer synthesis by neutralization of the acid copolymer in a ZSK 32 extruder via ZnO masterbatch. Preparation of masterbatch: The masterbatch used for the neutralization was essentially compounded of 22.5% by weight of ZnC and of high pressure polyethylene (LDPE with MI = 7 g/10 min and d = 0.9185 g/cm$^3$). Metering in of the monomer mixture was split in a ratio of 5:1 between the reactors 1 and 2.

| | | | | | | | | |
|---|---|---|---|---|---|---|---|---|
| for comparison 13 | 4.2 | 10.6/3.72 | 72.0 | 1.6 | 1.31 | 2.06 | 12 | 700 |
| for comparison 4 see above | 6.1 | (0.96/0.31) | 1.2 | 1.2 | 0.117 | 1.4 | 85 | 338 |

What is claimed is:

1. A film material prepared from a low density polyethylene (LDPE) which is an ionomer-modified copolymer wherein 30–95% of the carboxyl groups present in the copolymer are neutralized, and the neutralized carboxyl groups represent 0.1–0.6 mol %, of the total number of moles of all monomers in the copolymer said copolymer being an ethylene/carboxylic acid copolymer and wherein the copolymer contains acrylic acid or methacrylic acid as comonomers and wherein the cations of the metals sodium, zinc or magnesium are present in the copolymer.

2. A film material according to claim 1, wherein the copolymer possesses a melt index in the range of 0.1–20 g/10 min (190° C.; 2.16 kp).

3. A film material according to claim 1, wherein the copolymer is obtained by partial neutralization of an ethylene carboxylic acid copolymer with metal cations in the discharge extruder of the high pressure polyethylene production plant.

* * * * *